Nov. 2, 1965

R. H. OTIS 3,214,794

APPARATUS FOR FORMING STRUCTURAL UNITS
OR MODULES OF EXPANDED PLASTIC

Filed March 13, 1962

INVENTOR.
Roger H. Otis
BY *C. H. Hastings Ackley*
and
*Walter J. Jagmin*
ATTORNEYS INVENTOR.
Roger H. Otis Nov. 2, 1965

R. H. OTIS 3,214,794

APPARATUS FOR FORMING STRUCTURAL UNITS
OR MODULES OF EXPANDED PLASTIC

Filed March 13, 1962

INVENTOR.
Roger H. Otis

BY

ATTORNEYS

INVENTOR.
Roger H. Otis
BY *E. Hastings Ackley*
and
*Walter J. Jagmin*
ATTORNEYS Nov. 2, 1965 R. H. OTIS 3,214,794
APPARATUS FOR FORMING STRUCTURAL UNITS
OR MODULES OF EXPANDED PLASTIC
Filed March 13, 1962 7 Sheets-Sheet 7

INVENTOR.
Roger H. Otis
BY
ATTORNEYS

United States Patent Office 3,214,794
Patented Nov. 2, 1965

3,214,794
APPARATUS FOR FORMING STRUCTURAL UNITS OR MODULES OF EXPANDED PLASTIC
Roger H. Otis, P.O. Box 161, McAlester, Okla.
Filed Mar. 13, 1962, Ser. No. 179,366
17 Claims. (Cl. 18—5)

This invention relates to apparatus for forming structural units or modules and more particularly to apparatus for forming such units or modules of expanded plastic.

An object of this invention is to provide a new and improved apparatus for fabricating structural units or modules from an expandable plastic, having a traveling bottom section or wall whereby the fabricated modules may be moved clear of the apparatus for easy removal from the bottom wall.

A still further object is to provide an apparatus for fabricating modules having a mold box provided with a traveling bottom wall or section on which suitable module frames may be supported and side and top walls or sections movable away from the bottom wall whereby the fabricated module may be easily freed of the side and top walls to permit the bottom wall to be moved outwardly of the apparatus to clear the module for removal from the bottom wall by a suitable hoist means.

Another object is to provide an aparatus for fabricating modules of expandable material wherein one of the walls of the mold box is provided with suitable apertures through which perforate probes may be inserted into the cavity of the mold box and into the plastic so that steam under pressure may be introduced uniformly throughout the plastic within the mold box to subject the plastic within the mold box to uniform pressures and temperatures.

Still another object is to provide an apparatus for fabricating modules of expanded plastic wherein the top wall of the mold box and the probes are mounted on a traveling carriage whereby the top wall and the probes may be moved to a position laterally offset of the mold box to facilitate filling of the mold box with the plastic through suitable filler cones or spouts.

A further object is to provide a new and improved apparatus for fabricating structural modules having means for rigidly holding the movable side and top wall of the mold box against movement away from each other when the plastic within the mold box is subjected to high pressures.

A further object is to provide a new and improved apparatus having a mold box for forming structural modules wherein the mold box is provided with apertures through which steam probes may be inserted to project into the cavity of the mold box whereby all portions of the plastic within the cavity of the mold box may be subjected uniformly to high pressures and temperatures.

Another object of the invention is to provide a new and improved mold box having means for selectively cooling and heating the mold box in order to facilitate first the uniform heating of the plastic and then the cooling of the plastic to permit its removal from the mold box.

Additional objects and advantages of the invention will be readily apparent from the reading of the following description of a device constructed in accordance with the invention, and reference to the accompanying drawings thereof, wherein.

Figure 1:
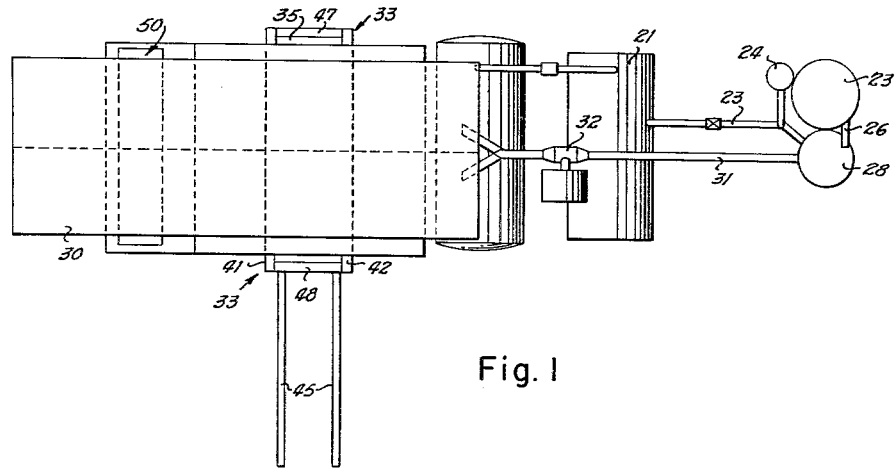
FIGURE 1 is a schematic fragmentary top view of the apparatus embodying the invention for fabricating structural modules.
Figure 2:
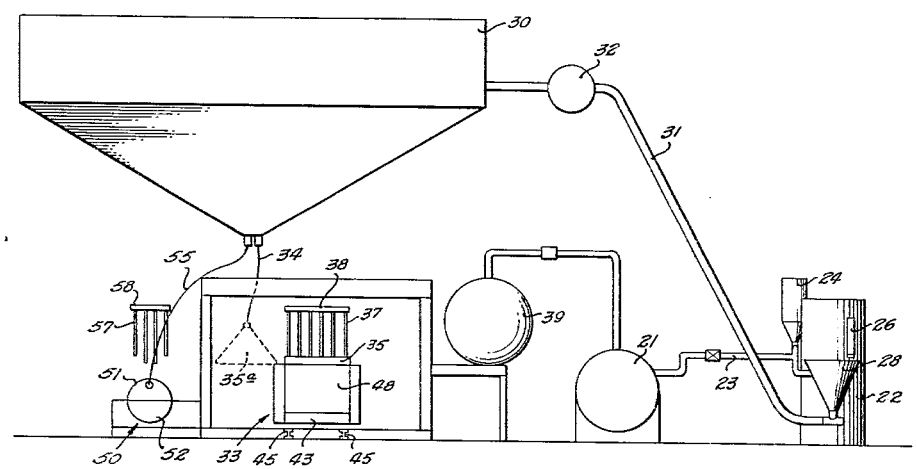
FIGURE 2 is a schematic side view of the apparatus.
Figure 3:
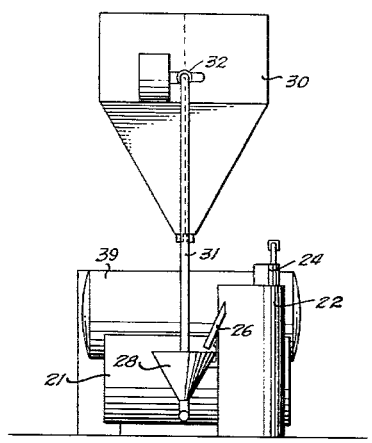
FIGURE 3 is a schematic end view of the apparatus illustrated in FIGURES 1 and 2.

Referring now particularly to FIGURES 1 through 3 of the drawings, the apparatus for fabricating structural units or modules includes a boiler 21 which supplies steam to a pre-expander unit 22 through the duct 23. The foamable plastic is introduced into the pre-expander 22 from a hopper 24. The foamable plastic may be polystyrene, or the like, and the foaming or charging agent may be methylchloride, butane, heptane, or the like. Polystyrene impregnated with such foaming agent is now presently commercially available in the form of beads of very small size. As the material expands, due to the action of the heat, it flows from the pre-expander through the discharge duct 26 into a receiver hopper 28. The partly expanded beads of the foamable plastic are drawn from the receiver hopper 28 and discharged into a closed storage hopper 30 by means of the duct 31 and the blower 32. The pre-expanded or partially expanded beads of the plastic are delivered from the storage hopper 30 into a mold box 33 through flexible conduits or hoses 34 and filler cones 35a secured to the lower ends of the flexible conduits.

The mold box 33 has a removable top wall 35 so that the filler cones 35a may be moved over the cavity of the mold box, in which one or more module frames may be present, when it is necessary to fill the mold with the pre-expanded beads of plastic. The top wall is slipped back over the side and end walls when the mold is filled and heat and pressure is then applied to the plastic in the mold by means of the steam probes 37 which are movable downwardly into the mold box through suitable apertures in the top wall 35, thereof. The probes are mounted on the probe heads 38 which are supplied with steam from the accumulator 39 by means of flexible conduits or hoses, not shown in FIGURES 1, 2 and 3. The probe heads are provided with hydraulic rams, not shown in FIGURES 1, 2 and 3, for moving the probes downwardly and upwardly relative to the mold.

The side walls 41 and 42 of the mold are mounted for pivotal movement about their lower ends so that when a module has been formed, the top wall 35 may be raised and the side walls 41 and 42 may be moved outwardly to free the module from the mold box and to permit the traveling bottom wall 43 of the mold, with the fabricated module resting thereon, to be moved outwardly on the rails 45 to permit removal of the fabricated module by any suitable hoist means. The rear end wall 47 and the front end wall 48 of the mold box may be rigid with the traveling bottom wall or be pivotally secured at their lower ends thereto.

A cylindrical mold box 50 having a hinged top 51 and a stationary bottom section 52 may be supplied with the pre-expanded beads from the storage hopper 30 by a flexible conduit or hose 55. The top section 51 of the cylindrical mold box is provided with apertures through which the steam probes 57 may extend to introduce steam into the mold to subject the plastic to heat and pressure. The probes 57 are mounted on a probe head 58 which is supplied with steam from the accumulator through the flexible conduits or ducts, not shown in FIGURES 1, 2 and 3. The probe head 58 is movable vertically by means of a hydraulic ram, not shown in FIGURES 1, 2 and 3. The upper top section 51 of the cylindrical mold 50 of course is pivoted upwardly when it is desired to remove the module formed in the cylindrical mold.

Due to the provision of the probes which extend downwardly throughout the plastic within the molds, all portions of the plastic within the mold boxes are subjected to high temperatures of approximately 230 degrees Fahrenheit and are also subjected uniformly to pressures of approximately fifteen pounds per square inch. As a result, the outer surfaces of the thus fabricated structural modules, due to the smoothness of the side walls of the mold boxes, are smooth and imperforate and will resist inpregnation by water. In addition, since the plastic of the module throughout its mass has been subjected to the same uniform temperatures and pressures, the plastic throughout the module attains the same physical characteristics of hardness, rigidity and strength so that the modules are very strong, although light, and may be combined and connected together to form marinas, wharves, rafts, and the like, as well as to form floatation units for various structures, such as boat houses.

Referring now particularly to FIGURES 4 through 10 of the drawings, the apparatus for fabricating structural units for modules includes a substantially rectangular support frame 70 having transversely extending side members or beams 71 and 72, which may be channel shaped and transversely extending intermediate beams or members 73 and 74 which are rigidly connected together in parallel relation by longitudinally extending beams 75. The longitudinal beams 75 may be in sections disposed between adjacent transverse beams and may be secured thereto in any suitable manner, as by welding. It will be apparent that the transverse and longitudinal members or beams form the substantially rectangular base 76 of the support frame. The support frame 70 also includes front vertical columns 77 and 78 and rear vertical columns 79 and 80 which may be of any suitable form, such as channel members. The four vertical columns are rigidly secured to the base frame 76 in any suitable manner, as by welding. A top frame 83 is rigidly secured to the four upright columns of the base frame 76, and may include the transverse side or beam member 84, which extends between the corner columns 77 and 79, the transverse side member or beam 85 which extends between and is supported on the columns 78 and 80 and the longitudinally extending I-beams 86, 87, 88, 89 and 90 whose opposite ends are rigidly secured to the side beams in any suitable manner, as by welding.

It will thus be apparent that the support frame 70 is comprised of the base frame 76 and the top frame 83 which is secured to the base frame by the four columns. Additional vertical columns, not shown, may be employed to secure the top frame to the base frame at such positions about the base frame as may be desired. The columns 77 and 78 are connected to the front longitudinal beam 75 by the diagonally extending braces 92 and 93, respectively, which may be channel shaped, while the rear corner columns 79 and 80 may be connected to the rearmost longitudinal beam 75 by the diagonal braces 95 and 96, respectively. The aligned front and rear columns 77 and 79 are connected by a horizontal tubular beam 97 which may be rigidly secured to these columns in any suitable manner, as by welding. The aligned front and rear corner columns 78 and 80 are similarly connected by a tubular horizontal beam 98 which is rigidly secured to these corner columns in any suitable manner, as by welding. Each of the horizontal tubular beams 97 and 98 may be formed of a pair of channel shaped beams which may be welded to one another.

The transverse beams 73 and 74 are provided with rails 110 and 111 which are receivable in the peripheral grooves of the wheels 113 rotatably secured to the bottom wall 43 of the mold box by means of U-shaped brackets 114 rigidly secured to the bottom wall and the shafts 115 carried by the brackets. The bottom wall 43 thus may be moved inwardly into the supporting frame on the rails 110 and 111 mounted on the transverse beams 73 and 74 of the base frame. The bottom wall of the mold box is also provided outwardly of the wheel with downwardly projecting lugs 117 which are adapted to engage the upwardly and rearwardly inclined cam surfaces 118 of the cam blocks 119 rigidly secured to the longitudinal beams 75 as the bottom wall approaches its innermost operative position within the supporting frame so that the engagement of the lugs 117 with the cam blocks 119 causes the bottom wall to be raised upwardly and thus move the wheels out of engagement with the rails so that the bottom wall is not supported by means of the wheels during operation of the mold. It will be apparent that when the interior or cavity of the mold box is subjected to a pressure of fifteen pounds per square inch by the steam introduced thereinto, the downward load on the wheels and on the shafts 115 on which they are mounted would be very great. Accordingly, the lugs and cam blocks are provided to relieve the wheels and their shafts or axles of such loads.

The bottom wall 43 may be formed of parallel side channel members 125 and 126 which are connected at their ends by rear and front channel members 127 and 128, respectively. The wheel brackets 114 on which the wheels 113 are mounted may be welded or otherwise secured to the lower bracing members 130 which extend between the side channel members 125 and 126. An upper plate 135 is secured to the upper flanges of the side and end channel members of the bottom wall to close the space therebetween and a lower plate 136 extends between the webs of the side and end channel members. The upper and lower plates are rigidly secured to the channel members in any suitable manner, as by welding, in fluid tight relation thereto and form a steam chest or chamber 137 therewith. A pair of bracing members 138 and 139 may extend between the end channel members of the bottom wall and between the upper and lower plates.

The upper plate 135 is provided with apertures 140 which open upwardly into the spaces formed by the spacer members 143 which are rigidly secured to the upper plate 135 by any suitable means, such as welding. The spacer members 143 are so constructed that they provide transverse and longitudinal grooves 146 and 147 and also arcuate grooves 148 for a purpose to be described below.

The rear end channel member 127 is provided with an inlet fitting 150 and an outlet fitting 151 for the circulation of fluids, such as steam or water through the steam chest 137. The bracing members 138 and 139 of course are provided with apertures to permit such circulation of the fluids throughout this steam chest. The apertures 140 in the upper plate also permit flow of such fluids into the spacers 143 so that the upper surfaces of the bottom wall defined by the spacers and the upper plate 135 may be heated or cooled as desired by the circulation of fluid into the inlet fitting 150 through the steam chest and then out through the outlet fitting 151.

If desired, the lower plate 36 may be omitted and heating and cooling fluids may be circulated through the spaces between the spacer members and the upper plate by means of suitable conduits, each such space then having an inlet and an outlet conduit which are interconnected so that these spaces may be collectively termed a chamber.

The inlet and outlet fittings 150 and 151 have rearwardly extending extensions 154 and 155, respectively, which are provided at their rear ends with male fittings 156 and 157, respectively, which are receivable in the sockets of female fittings 158 and 159, respectively, secured to the supporting frame rearwardly of the bottom wall. Each of the male fittings is provided with an O-ring 161 disposed in an external annular groove of the male fitting for sealing between the male fitting and the female fitting. The male and female couplings provide an automatic connection of the inlet and outlet fittings to suitable sources of cooling or heating fluids as desired, as will be explained in greater detail below.

The rear end wall may be pivotally secured to the bottom wall for limited pivotal movement about a horizontal axis by means of the shaft 164 which extends through suitable apertures in the rearwardly projecting brackets 165 of the bottom wall and downwardly projecting brackets 166 of the rear wall 47. The front wall 48 is similarly pivotally mounted about a horizontal axis by means of the shaft 168 which extends through suitable forwardly extending lugs 169 of the bottom wall and the downwardly extending lugs 169a of the front wall 48. The front wall 48, like the bottom wall, may be formed of an outer frame 170 formed of inwardly facing channel members and have an inner wall 171 and an outer wall 172 spaced from the inner wall and both rigidly secured in fluid tight relation to the frame 170 in any suitable manner, as by welding, to provide a chamber 174. The heating or cooling fluid is circulated through the chamber 174 by means of the inlet conduit 176 having three branches which open into the upper portion of the chamber 174. The chamber 174 is also provided with an outlet fitting or conduit 178 through which the fluid may leave the chamber 174. The lower end of the conduit 176 and the outlet 178 may be provided with suitable fittings by means of which the flexible conduits 180 and 181 may be connected thereto. The rear wall 47 may be of identical construction as the front wall and accordingly will not be described in greater detail, and has the inlet conduit 176a by means of which heating or cooling fluids may be introduced into its chamber 174a and an outlet conduit or fitting 178a by means of which the cooling or heating fluid may be drained from the bottom of the chamber as will be explained in greater detail below.

The side walls 41 and 42 may be of identical construction, each having a rectangular frame 185 formed of a channel shaped member frame 185 having downwardly depending lugs 186 which are pivotally secured to the lugs 187 of the transversely extending angle members 188 which are rigidly secured to the longitudinal beams 75 outwardly of the cam blocks 119 by means of shafts 190. The side walls 41 and 42 are of such length that they extend past the front and end walls and may be pivoted inwardly to engage the bottom wall and the end and rear walls. The side walls are provided at their forward and rear edges with inwardly extending hooks 192 which are adapted to engage the round bars 193 on the front and rear end walls. The hooks 192 have beveled surfaces which upon engaging the rods 193 tend to pivot the end walls inwardly toward one another upon movement of the side walls toward one another and to lock them against outward pivotal movement. The side and end walls are pivotal outwardly and away from the bottom wall to facilitate removal of the structural module after its fabrication. The side walls 41 and 42 may be provided with inner walls 194 secured to the frames 195 and with outer walls 195 similarly secured to the frames 185 and spaced from the inner walls to form chamber 196. Cooling and heating fluids may be introduced into the chamber 196 of the side walls through the inlet conduits or fittings 198 which are provided with a plurality of spaced outlet branches 199 which open into the chamber 195 at the upper ends thereof. Fluids from the bottom of the chambers may flow outwardly through the outlet conduits or fittings 200 in a manner to be explained below. Bracing members 202 may be provided within the rectangular frame of each side wall and outwardly of the outer wall thereof.

The side wall 41 is movable inwardly by a plurality of hydraulic rams 205 whose cylinders are rigidly mounted on the horizontal angle member 206. The horizontal angle member 206 is connected to the diagonally extending brace 92 by the horizontal angle member 209 and is connected to the rear diagonal bracing member 95 by the horizontal angle member 211. The hydraulic ram supporting angle member may be further supported by the vertical members 212 whose lower ends may be rigidly secured to the longitudinally extending beam 75. Each of the hydraulic rams has a piston 215 whose free end is pivotally connected by means of a pivot pin or bolt 216 to a link 217 and to a pair of links 218. The links 217 of each piston 215 are pivotally secured to the side wall 41 by means of the shaft 219 which extends through suitable aligned apertures in the link 217 and in the brackets 220a rigidly secured to the side wall. The pair of links 218 have their other ends pivotally secured by a bolt or shaft 220 to the adjustable rod 221 whose threaded end extends through suitable aperturers in the horizontal tubular beam 97. The adjusting rod has the nuts 222 threaded thereon on opposite sides of the horizontal tubular beam 97 to permit adjustment of the adjusting rod 221 relative to its associated hydraulic ram 205.

The cylinders of the hydraulic rams have upper conduits 225 and lower conduits 226 opening thereinto so that when fluid under pressure is introduced into the cylinders below the pistons of the hydraulic rams, while the conduits 226 are open, upward movement is imparted to the pistons 215 to cause upward movement of the shafts 216 and consequent downward pivotal movement of the links 217 and 218 toward one another and consequent outward movement of the side wall 41. When fluid under pressure is admitted into the hydraulic cylinders through the upper conduits 225 while the lower conduits 226 are open, the pistons 215 move downwardly and pivot the links 218 and 217 about the shafts 216 and cause inward movement of the wall 41 toward the side wall 42 and against the rear and end walls. The force with the side wall 41 is held against the side edges of the front and rear walls may be adjusted by rotation of the nuts 222 of the adjusting rod 221 on opposite sides of the tubular beam 97.

The side wall 42 is similarly movable inwardly and outwardly toward and away from the opposite side edges of the rear and end walls and the bottom wall by the pistons 231 of the hydraulic rams 232 mounted on the horizontal transverse angle member 233 secured at its forward end to the diagonal brace 93 by the horizontal angle member 234 and at its rear end by the angle member 235 which is secured to the diagonal brace 96. The horizontal angle members 233 may also be supported by the vertical columns 236 which extend to and are rigidly secured to the beams 75.

The free ends of the piston rods 231 of the hydraulic rams 232 are pivotally secured to the shafts 238 which also extend through suitable aligned apertures in the links 239 and the pair of links 240. The opposite ends of the links 239 are secured to the side wall 42 by means of the shafts 244 which extend through suitable aligned apertures in the links 239 and in the angle brackets 245 rigidly secured to the side wall 42. The ends of the links 240 are connected to an adjusting rod 248 by means of the shaft 249. The adjusting rod 248 is held rigidly in its horizontal position by means of the horizontal tubular beam 98, the adjusting rod extending through suitable aligned apertures in the horizontal beam and being secured thereto by the nuts 250 threaded on the adjusting rod and disposed on opposite sides of the tubular beam.

The cylinders of the hydraulic rams 231 are provided with upper and lower conduits 252 and 253, respectively, which are connectable to a source of fluid under pressure so that when the lower conduits 253 are connected to the source of fluid under pressure while the upper conduits 252 are open, the pistons 231 are caused to move upwardly and by means of the links connected to their upper ends pivot the side wall 42 outwardly. When the upper conduits 252 are connected to the source of fluid under pressure and the lower conduits 253 are open, the pistons are moved downwardly to cause the side wall 42 to move inwardly.

Figure 8:
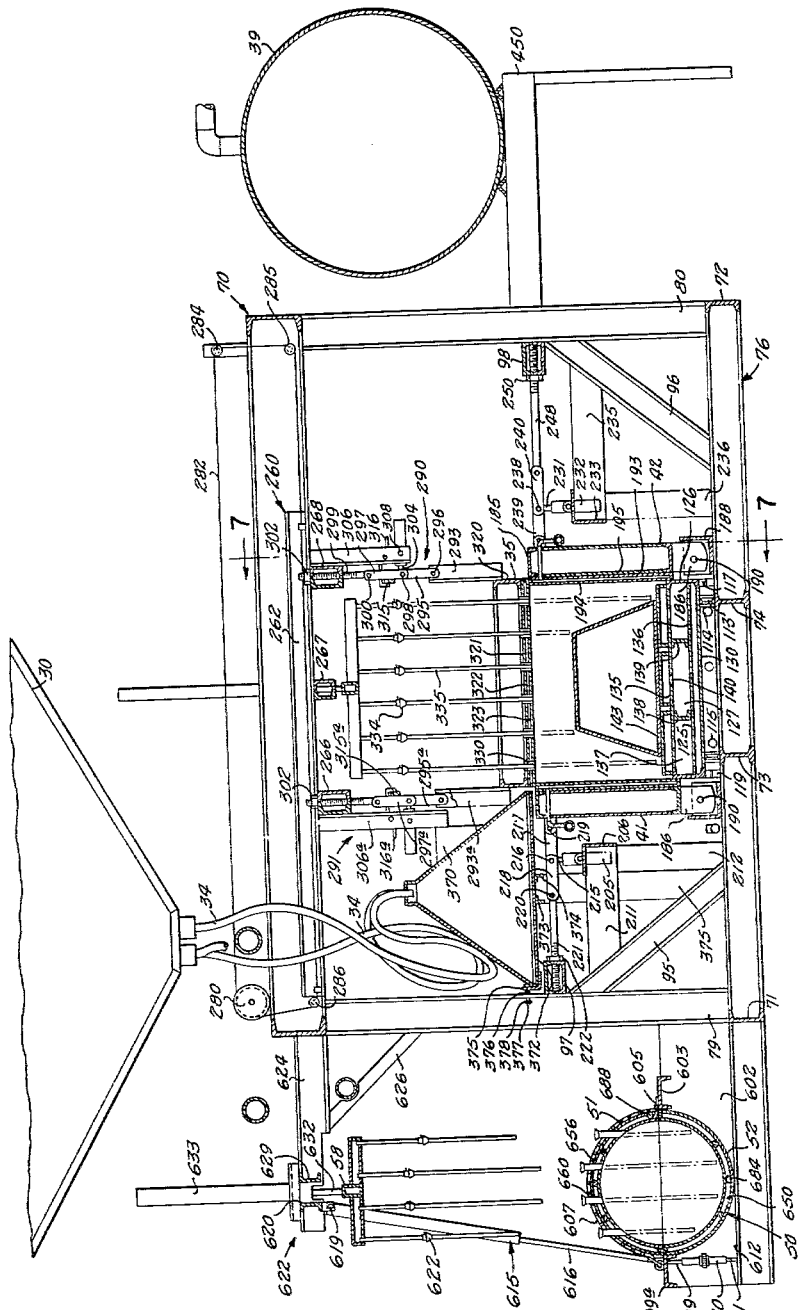
FIGURE 8 is a fragmentary sectional view, with some parts omitted.
Figure 9:
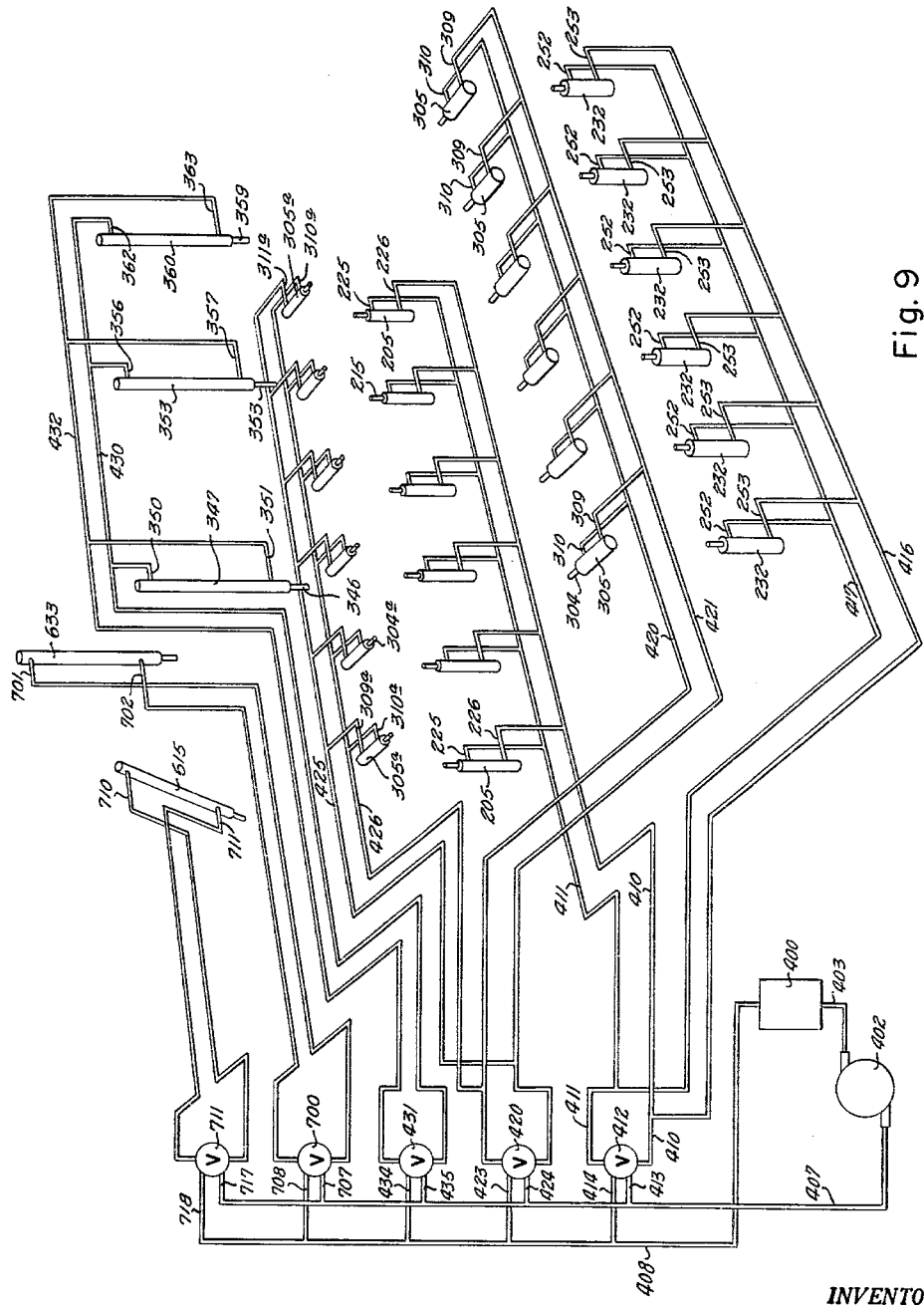
FIGURE 9 is a schematic illustration of the hydraulic system of the apparatus.
Figure 10:
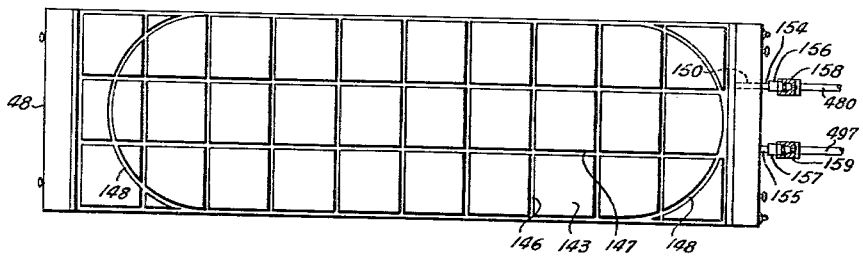
FIGURE 10 is a top view of the end walls and the traveling bottom wall of the mold box.
Figure 11:
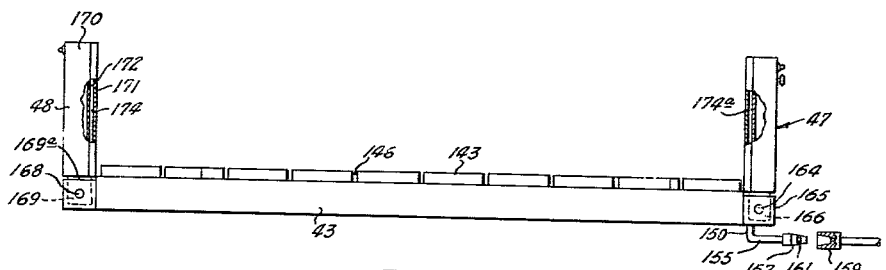
FIGURE 11 is a side view of the bottom and end walls of the mold box.
Figure 12:
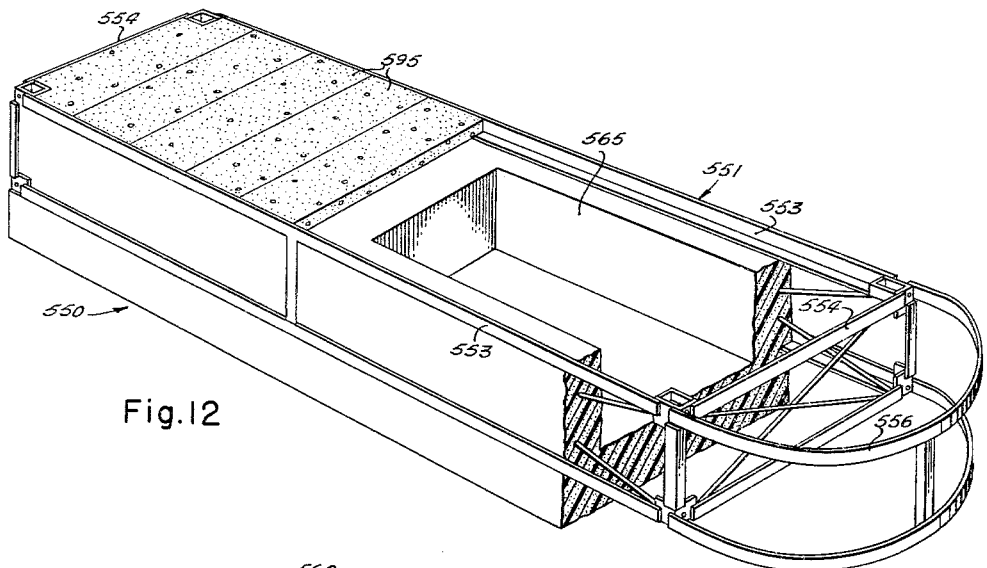
FIGURE 12 is a perspective view, with some parts broken away, of a module fabricated by the apparatus; and, FIGURE 13 is a perspective view of a filler block used with the apparatus.
Figure 13:
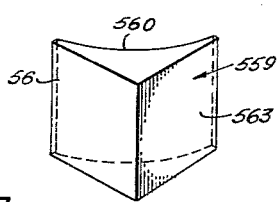

The top wall 35 is mounted on a carriage 260 which includes the three longitudinal channel members or beams 261, 262 and 263 which are rigidly secured to one another by the transverse tubular beams 266, 267 and 268. The transverse beams are secured to the longitudinal beams in any suitable manner, as by welding. Each of the longitudinal beams is provided with a plurality of rollers 270 rotatably mounted thereon by means of the bolts or shafts 271. The rollers 270 of the longitudinal beam 261 rest upon the horizontal flange 272 of the longitudinal beam 86 of the upper section of the supporting frame. The rollers 270 of the longitudinal beam 262 rest upon the flange 273 of the beam 88 and the rollers 270 of the longitudinal beam 263 rest upon the lower horizontal flange 274 of the beam 90 so that the carriage 260 is movable longitudinally on the top frame or section of the supporting frame. The carriage is movable by a winch 280 mounted on the top section or frame of the supporting frame and having a cable 282 which extends about the guide pulleys 284, 285 and 286 and whose opposite ends are secured to opposite ends of the middle longitudinal beam 262. It will be apparent that when the winch is rotated in a counter-clockwise direction, the beam will move towards the right as seen in FIGURE 8 and when it is rotated in the opposite direction, the carriage will be moved to the left. The winch 280 may be driven by a suitable electric motor, not shown. While the winch 280 has been shown as mounted on the top of the supporting frame, it will be apparent that it may be mounted at the side thereof or in any suitable location with the cable 282 extending about a guide or direction changing pulleys located wherever necessary.

The opposite sides of the top wall 35 are secured to the outer transverse tubular beams 266 and 268 by identical linkages 290 and 291. Each of the linkages 290 includes a pair of vertical angle members 293 and 294 secured to the side of the top wall 35, a lower link 295 pivotally secured at its lower end to the angle members 293 and 294 by any suitable means, as by a bolt or shaft 296, a pair of spaced links 297 whose lower ends are pivotally secured to the upper end of the lower link 295 in any suitable manner, as by a bolt or shaft 298, and whose upper ends are pivotally secured to the lower end of an adjusting rod 299 by a suitable bolt or shaft 300, and the adjusting rod 299 which extends through suitable apertures in the tubular beam 268 and is adjustably held thereon by means of the nut 302 threaded thereon. The pistons 304 of the hydraulic rams 305 are also pivotally secured to the bolts 298 which connect the links 290 to the links 297. The cylinder of each of the hydraulic rams 305 is rigidly secured, as by the bolts 308, between a pair of angle members 306 whose upper ends are rigidly secured, as by welding, to the transverse tubular beam 266. The cylinders of the hydraulic rams 305 are provided at their opposite ends with conduits 309 and 310.

The linkage 291 is similar in all respects to the linkage 290 and corresponding elements thereof and have therefore been provided with the same reference numerals to which the subscript "a" has been added.

It will be apparent that when the hydraulic fluid is admitted to the cylinders of the rams 305 and 305a through the conduits 309 and 309a while the fluid is permitted to escape from the cylinders of the hydraulic rams through the conduits 310 and 310a, respectively, the pistons will move inwardly toward one another and cause pivotal movement of the links about their connecting shafts or bolts, thereby causing upward movement of the wall 35 from the position illustrated in FIGURE 35 and out of engagement with the side and end walls. When fluid pressure is admitted into the cylinders of the hydraulic rams 305 and 305a through the conduits 310 and 310a while the conduits 309 and 309a are open to permit escape of fluid from the hydraulic rams, the pistons are moved upwardly relative to one another and cause downward movement of the top wall 35.

If desired, the links 297 may be locked against movement to prevent upward movement of the top wall by a transverse lock bar 315 and one or more hooks 316 pivotally mounted on the angle members 306 which support the hydraulic rams. The lock hooks 316 engage the lock bar 315. A similar lock bar 315a may be provided for links 297a of the linkage 291 which is engaged by one or more hooks 316a for locking the linkage in the position illustrated in FIGURE 8. It will be apparent that when the lock hooks 316 and 316a engage their lock bars 315 and 315a, respectively, the top wall is locked against upward movement.

The top wall 35 also has a substantially channel shaped rectangular outer frame 320 and upper and lower walls or plates 321 and 322 which are spaced to provide a chamber 323, which has an outlet fitting or duct 325 through which fluid may be introduced into the chamber and an outlet conduit 326 through which fluids may flow out of the chamber.

The top wall is provided with a plurality of tubes 330 which extend through the chamber 323 and through which the probes 37, which are mounted on the three transversely aligned probe heads 38a, 38b, and 38c may be inserted into the cavity of the mold box. Each of the probe heads is hollow and has a plurality of transversely spaced laterally outwardly extending extensions 331 from which the probes depend. The extensions 331 all communicate with the interior of the probe head on which they are mounted. The probes are hollow and their open ends are secured to the extensions 331 and open thereinto. The probes below the sealing means 334, adjacent the upper ends thereof have apertures or perforations 335 which are spaced both peripherally and vertically on each probe so that when the probes are moved downwardly through the tubes 330 of the top wall into the cavity of the mold box, any fluid introduced into the cavity through the probles will flow outwardly in many different directions at a multiplicity of spaced points within the cavity. The sealing means 334 may be of any suitable resilient substance and extend into and engage the upper ends of the tubes 330 to seal between the probes and the tubes and thus prevent escape of fluids from the cavity which are introduced thereinto by means of the probes.

The probe head 38a is provided with a pair of inlet fittings 337 to which the flexible conduits 338 are connected. The probe head 38b similarly is provided with a pair of inlet fittings 340 to which are connected the flexible conduits 342, and the rearmost probe head 38c has a similar inlet fitting 344 to which the flexible conduit or hose 345 is connected.

The probe head 38a is connected to the piston 346 of the hydraulic ram 347 rigidly secured to the intermediate transverse tubular beam 267. The piston extends downwardly through suitable apertures in the tubular beam. The cylinder of the ram 347 is provided with upper and lower conduits 350 and 351 through which fluid under pressure may be admitted to the cylinder. It will be apparent that if fluid under pressure is admitted into the cylinder of the hydraulic ram 347 through the upper conduit 350 while the lower conduit 351 is open to permit flow of fluid from the cylinder, the force of the fluid pressure exerted on the piston will move the piston, and the probe which is connected thereto, downwardly and, conversely, if fluid under pressure is admitted into the cylinder of the hydraulic ram through the conduit 351 while the upper conduit 350 is open to permit escape of fluid from the upper end of the cyclinder of the hydraulic ram, the piston 346 will move upwardly and thus raise the probe head 35a.

The probe head 38b is similarly supported by the piston 353 of the hydraulic ram 355 which is provided with the upper and lower conduits 356 and 357.

The probe head 38a is similarly supported by the piston 359 of the hydraulic ram 360 having upper and lower conduits 362 and 363. The cylinders of the hydraulic rams 355 and 360 are, of course, also rigidly secured to the intermediate transverse tubular beam 267 and their pistons 354 and 359, respectively, extend downwardly through suitable apertures in the transverse tubular beam.

It will now be seen that the probe heads 38 are mounted on the carriage 260 and are movable with the top wall.

Each of the filler cones 35a, 35b and 35c is secured to an adjacent angle member 306 of the traveling carriage 260 by a plate 370 and rests on a closure plate 372 which is slidably supported on the horizontal angle members 373 and 374. The angle members are secured to the supporting frame in any suitable manner, as by the vertical members 375 whose lower ends are rigidly secured, as by welding, to the longitudinal beams 75.

Figure 4:
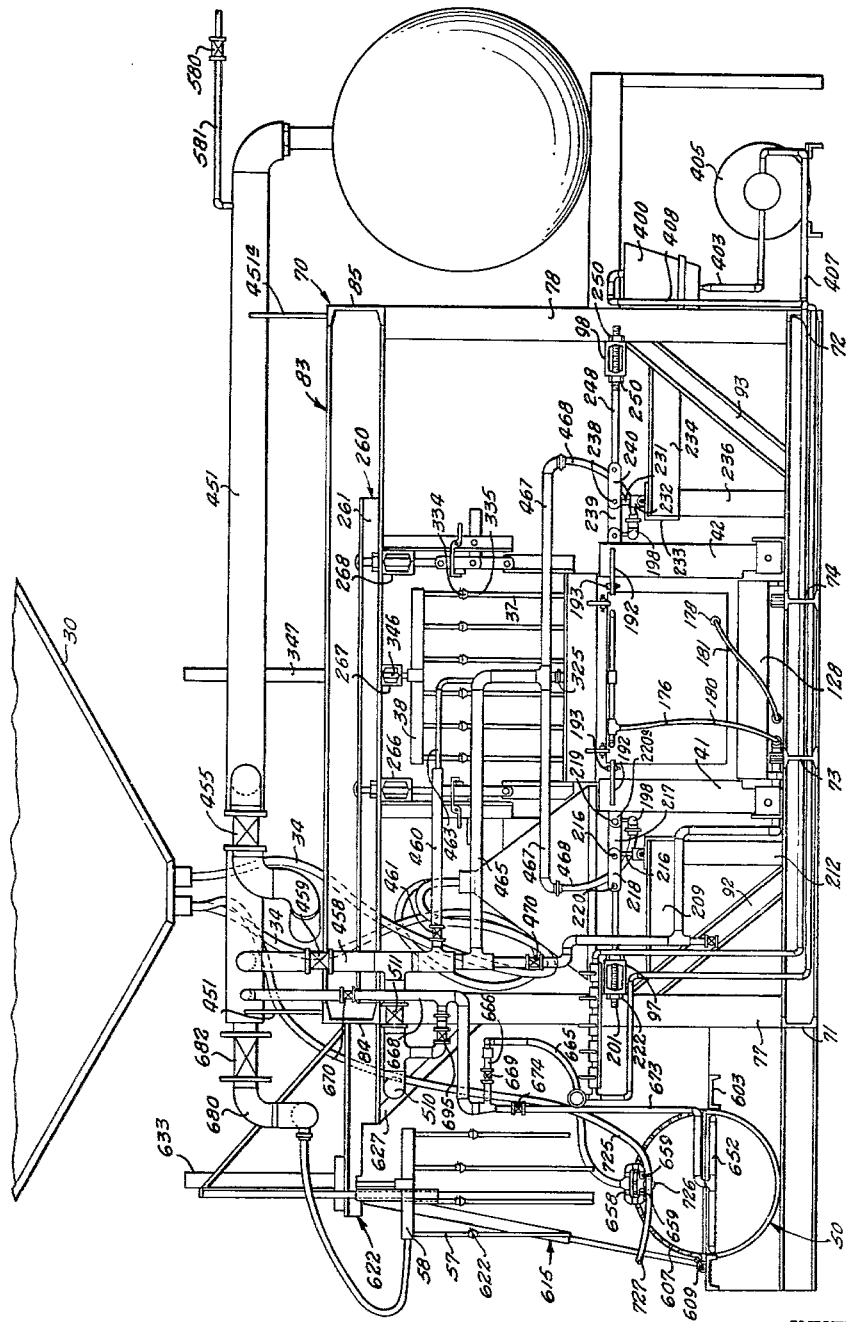
FIGURE 4 is a front view of the apparatus with some parts removed.
Figure 5:
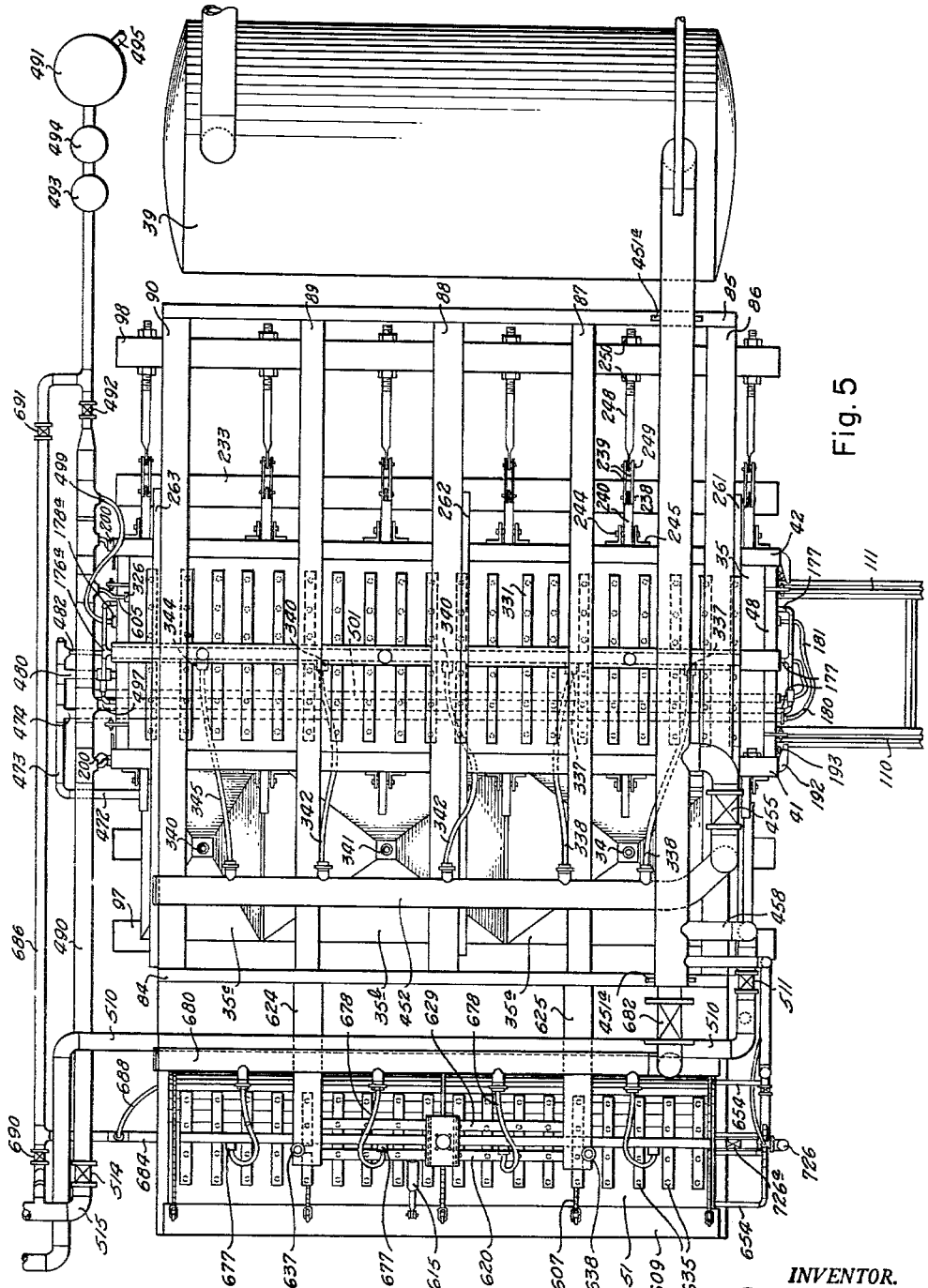
FIGURE 5 is a top view of the apparatus with some parts removed.

The closure plate 372 is slidable on the horizontal angle members 373 and 374 between the retracted position illustrated in FIGURES 4 and 8 and an extended position wherein the free edge of the closure plate is disposed in substantial alignment with the inner surface of the side wall 41. The outer side portions of the closure plate are secured to an angle bracket 375. The angle bracket is biased toward the right, FIGURE 8, by springs 376 disposed about the bolts 377 whose inner ends are rigidly secured to the angle member and whose outer ends extend through suitable apertures in the flanges of the vertical columns 77 and 79. The nuts 378 limit such movement of the closure plate toward the mold box. It will be apparent that as the carriage 260 moves towards the left to position the top wall 35 over the cavity of the mold box, the filler cones 38 slide over the closure plate 372 and, as they engage the supporting angle bracket 375, move the closure plate to the left and away from the top wall so that the closure plate is then spaced outwardly of the inner surface of the side wall 41 of the mold box.

The storage hopper 30 is supported above the supporting frame by suitable columns (not shown) and the flexible conduits 34 extend from the lower discharge apertures of the storage hopper to the upper ends of the filler cones so that the pre-expanded beads of the foamable plastic flow by gravity into the filler cones. When the filler cones are in the position illustrated in FIGURES 4 and 8, the closure plate which now closes the open lower ends of the filler cones prevents flow of the beads from the filler cones. As the carriage moves towards the right, as seen in FIGURE 8, moving the top wall to the right of the side wall 42, the filler cones are moved to positions directly above the bottom wall and between the sides and rear walls of the mold box. Simultaneously, the closure plate moves toward the right, under the force exerted by the springs 376, until its free edge is in substantial alignment with the inner surface of the side wall 41 whereupon the nuts 378 prevent further movement of the plate. The pre-expanded beads then flow through the filler cones into the cavity formed by the bottom side and end walls of the mold box. Movement of the carriage back towards the position illustrated in FIGURE 8 then causes the filler cones to move over the closure plate 372 which then retains any pre-expanded beads still in the filler cones. As such movement of the carriage continues, the engagement of the filler cones with the supporting angle member 377 then moves the closure plate, which now completely closes the lower open ends of the filler cones, to the left of the inner edge of the side wall 41 so that the top wall may then move downwardly without interference by such closure plate. Movement of the filler cones over the cavity of the mold box of course levels off the upper surface of the mass of beads and leaves the cavity completely filled with the beads.

The hydraulic rams for moving the side walls 41 42, for moving the top wall and the probe heads 38 are connected in a hydraulic pressure fluid system which includes a reservoir 400 from which fluid is delivered to the inlet of a pump 402 through a conduit 403. The pump 402 is driven by any suitable prime mover, such as an electric motor 405, mounted on a suitable platform 406 to one side of the supporting frame. The outlet of the pump 402 is connected to the pressure conduit 407 and fluid is returned to the reservoir 400 through the return conduit 408. The inlet and outlet conduits 225 and 226 of the hydraulic rams 205 which move the side wall about its pivot 190 are connected by the conduits 410 and 411 to the valve 412 which selectively connects these conduits to the pressure line 407 and the return line 408. The upper and lower conduits 252 and 253 of the hydraulic rams 232 which cause movement of the side wall 42 about its horizontal axis 190 are connected to the conduits 410 and 411 by the conduits 416 and 417, respectively. The valve 412 may be any suitable valve which in one position connects the conduit 410 to the pressure conduit 407 and the conduit 411 to the return conduit 408 and which in a second position connects the conduit 410 to the return conduit 408 and the conduit 411 to the pressure conduit 407. It will thus be apparent that when the valve 412 is moved to the first position, fluid under pressure will be admitted to the cylinders of the rams 205 and the hydraulic rams 232 through their upper conduits 225 and 252, respectively, and simultaneously fluid will be permitted to flow from the lower conduits 226 and 253 of the cylinders of these hydraulic rams back to the reservoir 400. As a result, the pistons of these hydraulic rams will be moved downwardly to cause the side walls to pivot toward each other and towards the side and end walls of the mold box. In the second position of the control valve 412, the lower conduits 226 and 253 of the hydraulic rams 205 and 232, respectively, are connected to the pressure line 407 and simultaneously the upper conduits 225 and 252 of the rams 205 and 232, respectively, are connected to the return line 408. In this second position of the valve 412, therefore, the pistons of these rams are caused to move upwardly and thus pivot the side walls outwardly and away from each other.

The conduits 309 of the cylinders of the hydraulic rams 305 are connected to a valve 420 by the conduit 421 and the conduits 310 thereof are connected to the valve 420 by the conduit 422. The valve is also connected to the pressure and return conduits 407 and 408, by the conduits 423 and 424. The conduits 309a of the cylinders of the hydraulic rams 305a are connected to the conduit 421 by the conduit 425 and the conduit 310a thereof are connected to the conduit 422 by the conduit 426. The valve 420 may be identical to the valve 412 and have a first position wherein it connects the conduit 421 to the pressure conduit 407 and the conduit 422 to the return conduit 408 and a second position wherein it connects the conduit 421 to the return conduit 408 and the conduit 422 to the pressure conduit 407. As a result, when the valve 420 is in its first position the pistons of the hydraulic rams 305 and 305a will move outwardly of the cylinders of their hydraulic rams and toward one another and will raise the top wall 35. When the valve 424 is in its second position, the pistons of the rams 305 and 305a are moved inwardly into the cylinders of their rams and outwardly of one another and will move the top wall downwardly.

The conduits 350, 356 and 362 of the hydraulic rams 347, 355 and 360, which support the probe heads 38a, 38b and 38c, respectively, are connected by the conduit 430 to the valve 431, which may be identical to the valves 420 and 412, and their conduits 351, 357 and 363 are connected to the valve 420 by the conduit 432. The valve 430 is also connected to the return conduit 408 by the conduit 434 and to the pressure conduit by the conduit 435. When the valve 431 is in a first position, the conduit 430 is connected through the valve to the pressure conduit 407 and at the same time the conduit 432 is connected to the return conduit 408. When the valve 431 is in its second position, the conduit 430 is connected to the return line 408 and the conduit 432 is connected to the pressure line 407. It will thus be apparent that when the valve 431 is in its first position, the pistons of the rams 347, 355 and 360 are moved downwardly simultaneously to move the probes through the tubes 330 of the top wall into the cavity or chamber of the mold box and that when the valve 431 is in its second position, the pistons move upwardly to move the probe heads upwardly and move the probes out of the cavity of the mold box.

The steam accumulator 39 may be mounted on a suitable platform 450 secured to the supporting frame in any suitable manner, and has a main outlet or steam duct 451. The main steam duct may be supported by means of the saddles 451a secured to the transverse beams 84 and 85 of the upper frame or section of the supporting frame. The probe branch 452 of the main steam duct has a valve 455 which controls flow of steam from the main duct 451 to the probe branch. The valve 455 may be of any suitable type. The probe branch has suitable outlets to which are connected the flexible conduits 338 and 342 and 345 through which steam is supplied to the probe heads 38a, 38b and 38c, respectively.

A vertical branch 458 of the main steam duct extends downwardly and forwardly of the supporting structure. The vertical branch has a valve 459 which controls flow of steam therethrough. The vertical branch 58 downstream of its control valve 459 is provided with an upper horizontal branch 460 having a valve 461 which controls flow therethrough. The upper horizontal branch 460 is connectable to the inlet conduit 325 of the top wall 35 by a suitable flexible conduit or hose 463. The branch 460, the inlet conduit 325 and the opposite ends of the flexible conduit 463 are provided with disconnectable fittings so that the flexible conduit 463 may be disconnected from either the branch 460 or the inlet conduit 325 when it is necessary to move the carriage and the top wall away from the branch 460. If desired, of course, the flexible conduit 463 may be of such length that it will accommodate the required lateral movement of the top wall.

The vertical branch 458 of the steam duct also has a lower horizontal branch 465 connected by the T fitting 466 to the oppositely extending conduits 467 which are connected by the flexible conduits or hoses 468 to the inlet conduits 198 of the side walls 41 and 42 of the mold box. The vertical branch 458 downstream of the lateral branches 465 and 460 thereof is provided with a valve 470 which controls flow of steam therepast to its lower horizontal section 472 which extends rearwardly, its rear section 473 which extends horizontally and longitudinally behind the transverse member or beam 73 of the base section or frame, and a section 474 which extends forwardly between the transverse beams 73 and 74 and forwardly of the bottom wall of the mold box when it is in its fully retracted position within the supporting section. A flexible conduit or hose 180 connects the section 474 at its forward end to the inlet conduit 176 of the chamber 174 of the front wall 48. The rear section 473 also has a branch 480 which is provided at its forward end with the female fitting or socket 156 so that when the bottom wall is in its fully retracted position, fluid may flow through the female fitting 156 and the male fitting 150 into the chamber 137 of the bottom wall.

The end of the rear section 473 of the horizontal section 472 is connectable to the inlet conduit 176a of the chamber 174a of the rear wall by a flexible conduit or hose 482 which may be connected thereto by a quick disconnectable fitting so that the hose may be disconnected from the inlet conduit 176a of the rear wall when it is necessary to move the bottom wall forwardly from its retracted position within the supporting frame.

The fluid, either steam, condensate or cooling water, from the chambers of the walls of the mold box is drained into a main exhaust duct 490 disposed rearwardly of the supporting frame which may conduct the fluid, if it is exhaust steam or condensate, back to the boiler. The condensate is moved by the pump 491, after passing through the strainer 493 into a reservoir or trap 494 to the boiler by the conduit 495. The main exhaust duct has a branch 497 whose forward end is provided with the female fitting or socket 157 so that when the bottom wall is in its innermost or retracted position within the supporting frame, the fluid from the chamber 137 of the bottom wall may flow through the branch 497 into the exhaust duct 490.

The outlet conduits 200 of the chambers 196 of the side walls 41 and 42 are preferably flexible and are also connected to the exhaust duct 490 so that the fluid may flow from the chambers 196 thereof into the exhaust duct. The outlet conduit or fitting 178a of the rear wall 47 is connected to the exhaust duct by a flexible conduit or hose 499 so that fluid from the chamber 174a may flow into the exhaust duct. The hose 499 of course may be disconnectable from the inlet conduit 178a so that it will not interfere with the movement of the bottom wall and the rear wall outwardly from the supporting frame.

The exhaust duct may also have a branch 501 which extends forwardly of the front wall 48 when the bottom wall is in its fully retracted position, and which is connectable by a flexible conduit or hose 181 to the outlet fitting or conduit 178 of the front wall so that fluid from the chamber 174 may flow to the exhaust duct. The outlet conduit or fitting 320 of the chamber 323 of the top wall is connectable by a flexible conduit or hose 505 to the exhaust duct. Such flexible conductor and the outlet conduit or fitting 323, of course, are disconnectable in order to permit movement of the top wall or, alternatively, the flexible conduit may be of such length as to accommodate the movement of the top wall.

The vertical branch 458 of the steam duct 451 is connected between the valves 459 and 457 to a water duct 510 provided with the valve 511. The water duct 510 is connected to any suitable source of cold water. The exhaust duct 490 is provided with its end remote from the valve 492 with another valve 514.

It will now be apparent that when the valve 511 of the water duct 510 and the valve 514 of the exhaust duct are closed and the valves 492, 459, 461, and 470 are open, steam will flow from the steam accumulator 39 into and through the cahmbers of the six walls of the mold box and the exhaust steam and condensate will flow into the exhaust duct 490 and thence through the strainer 493 and the trap 494, the pump 491 and the duct 495 back to the boiler. It will also be apparent that if the valve 455 is open, steam will flow to the probe heads and thence to the probes.

It will also be apparent that when the valves 492 and 459 are closed while the valves 461, 470 and 511 are open, water will flow from the water duct 510 through the various branches of the vertical duct 458 and through the chambers of the six walls to the exhaust duct 490 and thence through the valve 514 to be exhausted to the water exhaust duct 515 of the exhaust duct 490.

It will be apparent that the various flexible conduits by means of which the inlet and outlet conduits of the various walls are connected to the various branches of the vertical branch 458 and to the exhaust duct 490 may be provided with easy disconnect fittings so that they may be easily connected to the inlet and outlet conduits of the chambers of the walls.

In use, when it is desired to form a structural module such as the structural module 550 illustrated in FIG- URE 12, and the various components of the apparatus are in the positions illustrated in FIGURES 4 through 8 of the drawings, the valve 431 is opened to cause the pistons of the rams 347, 344 and 366 to move to their extreme upper positions and the valve 420 is opened to cause the pistons of the hydraulic rams 205 and 232 to raise the top wall. The valve 412 is then actuated to cause the hydraulic rams 205 and 232 to pivot the side walls 41 and 42 outwardly and out of engagement with the end and rear walls, thus freeing the bottom wall 43 for forward movement on the rails outwardly of the supporting frame. As the side walls move outwardly, they free the front and rear walls for outward movement relative to the front and rear end, respectively, of the bottom wall since the hooks on the side walls move out of engagement with the front and rear walls.

The bottom wall may be moved outwardly on the rails manually or suitable power means may be provided for moving it between its two positions. For example, a winch similar to the winch 280 employed for moving the carriage 260 may be employed for this purpose.

The bottom wall is then moved forwardly on the rails and outwardly of the supporting frame so that the frame 550 of a module 551 which is to be fabricated may be placed on the bottom wall with the longitudinal outer flanges 553 of the angle members thereof disposed in the outermost longitudinal grooves 146 and with any transversely extending vertical flanges, such as the flanges 554, disposed in the transverse grooves 147. If the frame 551 has an arcuate forward or rear portion, the vertical flange 556 defining such arcuate portion is disposed in the arcuate groove 148 of the bottom wall. Filler blocks 559 are then disposed on the bottom wall with their curved surfaces 560 abutting the frame so that one of their sides 561 will abut the inner surfaces of the side walls 41 and 42, respectively, and their other vertical sides 563 will abut the inner surface of the rear wall of the mold box. The top surfaces of the spacer blocks will of course be engaged by the top wall when the mold box is completely assembled.

The frame 551 may be formed of a number of sections or be of a single integral number of sections connected together in any suitable manner and may extend over the whole length of the bottom wall. If modules of shorter length are desired, suitable rectangular filler blocks may be provided to fill in the space not filled in by the frame of the module.

If it is desired that the module be provided with a void, such as the void 565, a suitable filler block 567 of the proper form is placed on the bottom wall within the module frame. Once the frame has been properly positioned on the bottom wall the bottom wall is moved back inwardly to its fully retracted position. The valve 412 is then actuated to cause the hydraulic rams 205 and 232 to pivot the side walls inwardly toward one another and into engagement with the outer edges of the bottom wall and of the rear and front walls. The lock hooks of the side walls of course engage the front and rear walls to lock the front and rear walls in vertical position and hold them against outward movement. The top wall is now disposed above the cavity of the mold box. In order now to fill the cavity of the mold box with the pre-expanded beads from the storage hopper 30, the electric winch 280 is actuated to move the carriage 260 to the right, as seen in FIGURE 8. As the filler cones 38 move over the cavity the pre-expanded beads flow downwardly by gravity through the flexible conduits 34 and the filler cones 35 until the cavity is completely filled with the beads. The winch is then again actuated to move the carriage back to the position illustrated in FIGURE 6 wherein the filler cones and the closure plate 372 do not extend over the cavity.

Figure 6:
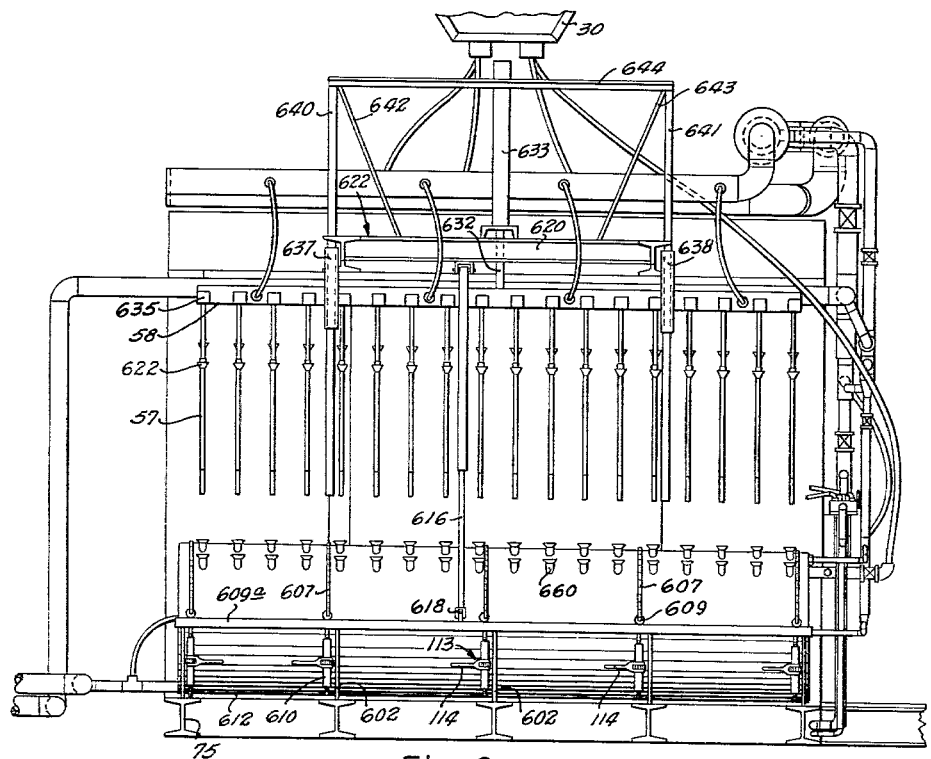
FIGURE 6 is an end view of the apparatus with some parts omitted.
Figure 7:
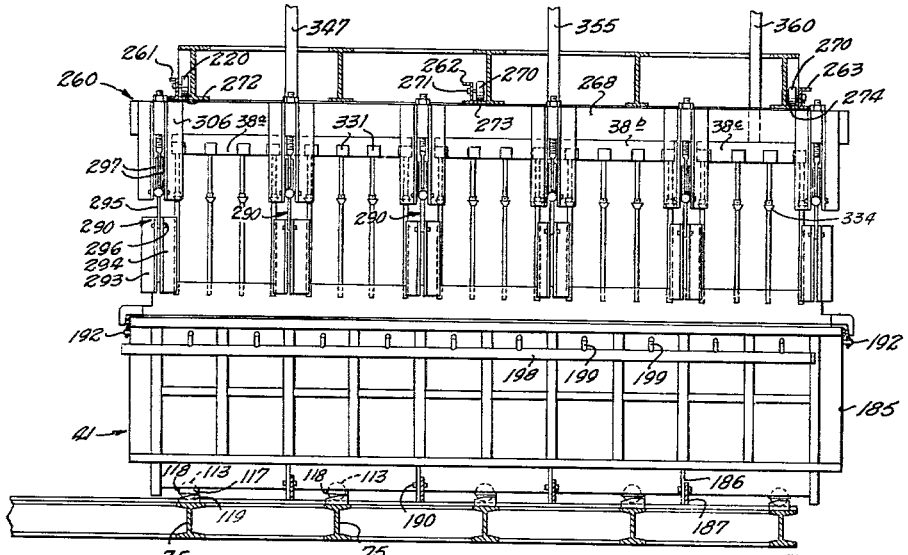
FIGURE 7 is a sectional view of the aparatus taken on line 7—7 of FIGURE 8.

If filler blocks, such as the blocks 559 or 565, are now disposed on the bottom wall, the probes 37 which would otherwise move downwardly into the spaces occupied by such blocks are removed from the probe heads and the openings of the probe heads in which such probes were received are closed by suitable plugs. If the filler block 565 has inclined sides, as illustrated in FIGURE 6, the probes immediately above such sides are replaced by shorter probes so that when such probes are inserted in the cavity, they will not engage such sides of the filler block.

The valve 420 is then actuated to cause the hydraulic rams 305 and 305a to move the top wall 35 downwardly to engage the upper edges of the side and rear walls. The cavity of the mold box is now fully closed and the hydraulic rams now hold the various walls of the mold box from movement away from each other. If desired, suitable gaskets may be interposed between adjacent edges of the various walls to insure a fluid tight seal between the walls of the mold box.

The various flexible conduits are connected to the inlet and outlet conduits of the walls as required.

The valve 431 is then actuated to cause the hydraulic rams 347, 355 and 366 to move the probe heads 38 downwardly until the probes 37 thereof are disposed within the mold box and the seals or plugs 334 close the tubes 330 through which the probes extend.

The valve 455 of the steam duct 451 is then opened to permit steam to flow through the probe heads and into the cavity. If desired, the valve 580 of an auxiliary steam conduit 581, which is connected to the boiler and to the steam duct line 451, may be opened to permit flow of steam directly from the boiler as well as from the steam accumulator in order to increase the rate of flow of steam to the probes and also to increase the circulation of steam through the chambers of the walls since the valves 459, 461 and 470 are also open. The exhaust steam and condensate of course now flow through the exhaust duct 490 and thence to the strainer and the trap and are then pumped back to the boiler.

Since all surfaces of the walls defining the cavity of the mold are now heated and since steam of substantially the same temperature is now introduced into the cavity, the temperature at all points within the cavity is raised to a predetermined value, say, two hundred thirty degrees Fahrenheit, and at the same time the pressure at all points within the cavity is also raised to a predetermined value, say fifteen pounds per square inch. As a result due to the provision of the probes which eject steam at various points or locations within the cavity which are spaced both vertically and horizontally throughout the volume of the cavity, the whole mass of the plastic is subjected to uniform temperatures and pressures and now expands to form a strong unitary mass.

The temperature and pressure conditions within the cavity of the mold are maintained for a period of time sufficient to cause full expansion of the plastic at the end of which time the valve 455 is closed to stop flow of steam to the probes and the valves 431 is opened to cause upward movement of the probe head and the withdrawal of the probes from the cavity. As the probes move outwardly, the spaces occupied by the probes are filled in by the plastic as it expands further to fill in the voids or gaps left by the withdrawal of the probes. After the probes have been withdrawn and a predetermined period of time, sufficient to permit full closing of the voids by the still expanding and curing or setting plastic, has elapsed, for example, fifteen or twenty seconds, the valve 459 and the exhaust duct valve 492 are closed and the valves 514 and 511 are opened to permit cold water to circulate through the chambers of the walls of the mold box to cool the module formed within the mold box. After the thus fabricated modulated module has been cooled by the circulation of water through the chambers of the walls of the mold box which may take approximately fifteen minutes, the valve 511 is closed and circulation of water is stopped. The valve 420 is actuated to cause the rams 305 and 205a to raise the top wall 35 of the mold box and subsequently the control valve 412 is actuated to cause the rams 205 and 232 to pivot the side walls 41 and 42 outwardly which now frees the rear and end walls to pivot outwardly since the lock hooks of the side walls do not disengage from the front and rear walls. The various flexible conduits if they are not long enough, as is preferable, to accommodate movement of the various walls, are now disconnected from the various walls to permit their movement to their outer positions. The formed module is now free for removal from the bottom wall since it is now disengaged from the side and end walls. The bottom wall is then moved outwardly from the retracted position within the supporting frame to a position disposed outwardly therefrom so that any suitable hoisting mechanism may now be connected to the module and lifted upwardly off the bottom wall. Another module frame may then be placed on the bottom wall and the above cycle of operation repeated.

It will be apparent that due to the use of the block 565 the structural module has a recess formed in its upper surface and that the horizontal flanges 554 thereof face upwardly so that concrete slabs 595, planking or the like, may be disposed thereon and between the vertical flanges 553 to form a walkway or supporting surface. The expanded plastic is thus protected from contact along the surfaces which would otherwise be exposed to traffic or wear. The recess may be provided to economize on the amount of the plastic employed.

The various valves for controlling flow of steam and water may be provided with any suitable remotely controlled operator means, such as solenoids or hydraulic rams, which have not been shown, and the controls for such operator may be located adjacent the hydraulic control valves which control the actuation of the various hydraulic rams.

It will now be apparent that a new and improved apparatus for fabricating structural modules has been illustrated and described which includes a mold box formed of a plurality of walls which are movable relative to one another and that one of the walls is provided with apertures through which probes may be inserted into the cavity of the mold box to subject the material disposed therein uniformly to heat and pressure.

It will further be seen that the bottom wall of the mold box is movable outwardly of all other structures so that the frames for the structural modules may be easily mounted on the bottom wall and the fabricated structural modules may be easily hoisted or removed from such bottom wall.

It will further be seen that the apparatus includes a simple and automatic means for filling the cavity of the mold box with the plastic substance which is to be expanded which includes the filler cones movably mounted on the same carriage as the top wall of the mold box so that as the top wall is moved outwardly to open the cavity, the filler cones are moved into position above the cavity to permit filling of the cavity with the beads or granules of the plastic substance.

It will further be seen that a closure plate is provided for the filler cones which is biased toward the cavity and moves to an edge thereof so that none of the beads of the plastic substance are spilled as the filler cones move over the cavity and that the plate is moved back by engagement with the filler cones as the filler cones move over the closure plate and out of filling position over the cavity of the mold box.

It will further be seen that due to the provision of the means for circulating steam for heating and cooling the surfaces of the mold box, which of course are formed of metal to withstand the pressures and also to provide the desired heat conductivity, the period of time required for the fabrication of a module is relatively short.

It will further be seen that the apparatus for fabricating the structural modules illustrated and described permits fabrication of the modules with a minimum expenditure of time and labor.

It will further be seen that the method for forming or fabricating structural units or modules of expandable plastic comprises disposing the plastic in a cavity or chamber, closing the chamber, introducing steam into the cavity at various spaced locations within the cavity to subject the plastic throughout the cavity uniformly to pressure and heat for a predetermined period of time, cooling the expanded plastic substance, opening the cavity, and removing the fabricated structural unit or module.

The cylindrical mold box 50 is mounted on the saddle plates 602 which extend upwardly from the longitudinal beams 75 and which have arcuate recesses which conform to the cylindrical configuration of the bottom section 52. A transverse inverted channel member 603 is secured to the saddle plates by welding and its downwardly extending flanges are received in suitable notches or slots in the upper edges of the saddle plates. A plurality of hinges 605 hingedly secure the top semi-cylindrical section 51 of the cylindrical mold box to the transverse inverted channel member so that the top section 51 of the mold box may pivot upwardly to open the mold box and permit removal of the rod or log shaped module formed therein.

A plurality of hold-down chains 607 also have one end secured to transverse inverted channels 603 and their other ends to eye bolts 609 whose shanks extend downwardly through suitable apertures in a boom 609 and are receivable in the upper ends of the internally threaded sleeve 610 whose lower ends telescope over the upwardly extended threaded studs 611. The studs are secured to a plate 612 rigid with the beams 75. It will be apparent that the eye bolts, the sleeve 610 and the studs 611 in effect form a turnbuckle so that the boom and the chains are pulled downwardly when the sleeves are rotated in one direction to securely hold the top section of the mold box in its lowermost position and that the chains and the boom are freed for upward movement when the sleeves are rotated in the opposite position until the eye bolts are moved out of the sleeves at which time the boom and the chains may be moved upwardly. A ratchet assembly 113, including the handle 114, may be mounted on each of the sleeves to facilitate their rotation.

The boom is rigidly secured to the top section 51 of the mold box and is movable upwardly by a hydraulic ram 615 the free end of whose piston 616 is pivotally secured, as at 618, to the boom and whose cylinder is pivotally secured at its upper end, as at 619, to the transverse beam 620 of the frame extension 622 of the supporting frame. When the piston moves to its fully retracted position, the top section 51 is pivoted upwardly and to the right as seen in FIGURES 4 and 8 to an open position to permit removal of the fabricated module from the cylindrical mold.

The frame extension 622 includes a pair of horizontal beams 624 and 625 which are provided with diagonally extending braces 626 and 627. The diagonal braces 626 and 627 extend between the horizontal beams and vertical columns of the supporting frames. The two horizontal beams 624 and 625 are connected by a pair of transverse beams 620 and 629.

The probe head 58 is supported on the frame extension 622 by the piston 632 of the hydraulic ram 633 mounted on the transverse beams 620 and 629 whose cylinder extends downwardly therebetween. The probe head 58 may be provided with a plurality of spaced lateral extensions 635 to which the probes 57 are secured. The probe head may be provided with a pair of vertical guide sleeves 637 and 638 slidable on the vertical guide rods 640 and 641 rigidly secured to the frame extension 622 by the diagonal braces 642 and 643. The flanges of the horizontal beams 624 and 625 are provided with suitable recesses or slots to accommodate the guide sleeves 637 and 638 and the guide rods 640 and 641. The guide rods are also secured to the horizontal beams in any suitable manner, as by welding. The upper ends of the guide rods are secured by the cross bar 644.

The lower section 50 of the cylindrical mold box is double walled to provide a chamber 650 into which fluids may be introduced through the inlet conduit 652 which has a plurality of branches 654 opening into the chamber 650. The upper section 51 of the cylindrical mold is similarly double walled to provide a chamber 656 into which fluids may be introduced by the inlet conduit 658 which has a pair of branches 659 opening into the chamber.

The upper section has a plurality of tubes 660 which open into the cavity of the cylindrical mold box and through which the probes 57 pass into the chamber when the probe head is lowered by the hydraulic ram. The probes are provided with suitable plugs or sealing members 662 which engage the tubes 660 to seal between the probes and the tubes when the probes are disposed within the cavity of the mold.

The inlet conduit 658 of the top section 51 is connected by a flexible conduit or hose 665 to the branch 666 of the vertical duct 668 whose upper end is connected to the steam duct 451. The branch 666 is provided with a valve 669 and the duct 668 is provided with a valve 670. It will be apparent that when the valves 670 and 669 are open, steam will be introduced into the chamber 656 of the upper section. The inlet duct 652 of the lower section is connected by the conduit 673 to the duct 668. The conduit 673 is provided with the valve 674. It will be apparent that steam will be introduced into the chamber 650 of the lower section of the cylindrical mold box when the valves 674 and 670 are open.

The probe head is provided with a plurality of inlets 677. The inlets 677 are connected by the flexible conduits 678 to a transverse duct 680 which is connected to the steam duct 451 through the valve 682. It will be apparent that when the valve 682 is open, steam will flow into the probe head and thence through the probes and out of their perforations into the cavity at various spaced points within the cavity when the probes are disposed in operative position within the cavity.

The chamber 650 of the lower section is provided with an outlet conduit 684 which is connected to the auxiliary exhaust duct 686 and the chamber 656 of the upper section is provided with a flexible outlet conduit 688 which is connected to the conduit 684. The auxiliary exhaust duct is connected to the exhaust outlet 515 by the valve 690 and to the main exhaust duct 490 by the valve 691 and the connector duct 692.

It will now be apparent that when the valves 492 and 514 at the opposite ends of the main exhaust duct 490 are closed and the valve 691 is open while the valve 690 is closed steam introduced into the chambers 650 and 656 will flow through the chambers and the exhaust steam and condensate will flow through the outlet conduits 684 and 688 into the auxiliary exhaust duct 686 and thence back to the boiler through the strainer, the trap and the pump 491.

The water duct 510 is connected to the vertical duct 668 by the branch 694 which has the valve 695.

Movement of the hydraulic ram 633 is controlled by a valve 700 which is connected to the upper and lower conduits 701 and 702 of the cylinder of the hydraulic ram 63 by the conduits 704 and 705. The valve 700 is connected to the pressure conduit 407 and the return conduit 408 by the conductors 707 and 708. The valve 700 when in a first position connects the upper conduit 701 to the pressure conduit 407 and the lower conduit 702 to the return line 408. In this position, of course, the pressure of the fluid from the pressure conduit 407 moves the piston 632 of the hydraulic ram downwardly. In the second position of the valve 700, the upper conduit 701 is connected to the return line 408 and the lower conduit 702 is connected to the pressure line 407. The pressure of the fluid from the pressure line of course then moves the piston 632 upwardly and raises the probe heads.

The upper and lower conduits 710 and 711 of the hydraulic ram 615 are connected to a valve 712 by the conduits 714 and 715, respectively. The valve 712 is also connected to the pressure line 407 and the return line 408 by means of the conduits 717 and 718, respectively. In a first position, the valve 712 connects the upper conduit 710 to the pressure line 407 and the lower conduit 711 to the return line 408. In this position of the valve, the pressure of the fluid in the pressure line tends to move the piston 616 of the hydraulic ram 615 downwardly and thus move the top section of the cylindrical mold box to its lower closed position. In a second position, the valve 712 connects the upper conduit 710 to the return line 408 and the lower conduit 711 to the pressure line 407. In this second position of the valve the piston 616 is moved upwardly to open the mold box and permit removal of the fabricated module therefrom.

The upper section of the mold box is connected to the storage hopper 30 by a flexible conduit or hose 725 and a Venturi pump 726 whose inlet opens through a valve 726a into the interior cavity of the mold box. The Venturi pump is provided with a flexible conduit 727 by means of which compressed air is supplied to the pump. When compressed air is supplied to the Venturi pump 726 and the valve 726a is open, the plastic beads from the hopper 30 are blown into the interior of the cavity of the cylindrical mold, the air escaping from the mold through the tubes 660.

In use, when it is desired to form a rod or log shaped module, the top section 51 of the mold box is moved to its closed position by means of the fluid under pressure whose entry into the top conduit 710 of the hydraulic ram 615 is controlled by the valve 712. The eye bolts are then threaded into the upper ends of the sleeves 610 which are then rotated to secure the top section to the bottom section. Suitable gasket means (not shown) may be provided between adjacent abutting edges of the top and bottom sections of the cylindircal mold to prevent escape of fluid therefrom. Compressed air is then admitted to the Venturi pump 726 to fill the cylindrical cavity of the cylindrical mold with the pre-expanded beads. The valve 726a is then closed to prevent backward flow of fluids through the Venturi pump.

The hydraulic ram 633 is then supplied with fluid pressure by proper manipulation of the valve 700 to cause the probe heads to move downwardly to position the probes within the cavity of the cylindrical mold. The valve 695 of the water line branch 694 is closed and the valves 670 and 674 are then opened to cause flow of the steam into the chambers 650 and 651 of the lower and upper sections of the cylindrical mold box. The valves 514, 690 and 492 are now closed while the valve 691 is open so that the exhaust steam and condensate will flow back to the boiler through the auxiliary exhaust duct 686, strainer 493, the trap 494 and the pump 491. Steam is now introduced to the probe head 58 by the opening of the valve 682.

As a result, the pre-expanded beads of plastic within the cylindrical mold are now subjected to temperatures of approximately two hundred thirty degrees Fahrenheit and to pressures of approximately fifteen pounds per square inch. After the plastic has been subjected to these temperatures and pressures for a predetermined period of time, the valve 682 is closed and the valve 700 is actuated to cause the probe head 58 and the probes 57 to be moved upwardly and out of the cavity of the cylindrical mold. As the probes move upwardly the spaces occupied thereby are filled by the plastic as it continues to expand as it cures or sets.

The steam valve 670 is then closed and the water valve 695 is opened to permit cold water to flow in from the water duct 510 into the chambers 650 and 656 of the bottom and top sections of the mold box. The valve 690 is opened and the valve 691 is closed while valves 514 and 492 at the opposite ends of the main exhaust duct 490 remain in closed position so that the exhaust water will now flow outwardly through the exhaust duct 686 from these chambers and the open valve 690 to the water outlet pipe 515. This circulation of cold water is maintained for a predetermined period of time necessary to cool the plastic to a desired degree. At the end of this time, the water valve 695 is also closed. The sleeves of the turnbuckles are then rotated to free the eye bolts and the valve 712 is moved to a position wherein pressure fluid is admitted to the lower inlet conduit 711 of the hydraulic ram 615 whereupon the hydraulic ram pivots the upper section about the hinges 605 to its open position to permit removal of the fabricated structural module. If desired, a metal frame may be disposed within the cylindrical mold box in the same manner as metal frames are disposed in the rectangular mold box although the rod or log shaped modules fabricated in the cylindrical mold may be made without any such frame.

It will be apparent that the various water and steam valves associated with the cylindrical mold box may also be actuated by either solenoids or hydraulic operator means if desired, so that all controls for the various valves may be at a central location and operable by a single operator.

It will be apparent that the rectangular mold box and the cylindrical mold box may be used alternately with the steam being admitted to the cylindrical mold while the module in the rectangular mold box is being cooled by the circulation of water and that the module in the cylindrical mold box may be cooled while the plastic within the rectangular mold box is cooling in order to best utilize the services of the operator and in order to minimize the maximum required capacity of the boiler, steam accumulator and the various water and exhaust ducts.

What is claimed and desired to be secured by Letters Patent is:

1. An apparatus for fabricating structural modules including: a mold box provided with a cavity and having at least one wall movable to open said cavity to permit the introduction of an expandable substance into the cavity and the removal of the fabricated module therefrom; said mold box having a plurality of spaced apertures opening into said cavity; and a plurality of elongate spaced probes movable into said cavity through said apertures, said probes being hollow and having a plurality of circumferentially and longitudinally spaced perforations, said probes having means for connection to a source of steam under pressure whereby steam under pressure may be introduced into said probes and through the perforations of said probes into the cavity at spaced locations in the cavity; and means carried by said probes and engageable with said mold box when said probes are disposed in said cavity for sealing between said probes and said mold box to close said apertures to prevent flow of fluid from said cavity.

2. An apparatus for fabricating structural modules including: a rectangular mold box providing a cavity having a bottom wall, a pair of side walls disposed on opposite sides of said bottom wall, a pair of end walls disposed on opposite ends of said bottom wall, and a top wall disposed above said side and end walls; means for supporting said top wall and for moving said top wall vertically and horizontally between a closed position over said end and side walls and closing said cavity and a position remote from said cavity wherein said top wall is not disposed above said cavity whereby said cavity may be opened for the introduction of an expandable substance thereinto and for the removal of a fabricated module therefrom when said top wall is in a said position remote from said cavity, said top wall having a plurality of spaced apertures which are open into said cavity when said top wall is disposed in said position over said end and side walls and closing said cavity; a plurality of spaced probes movable into said cavity through said apertures, said probes being hollow and having a plurality of spaced lateral perforations; means for supporting said probes and for moving said probes vertically through said apertures into and out of said cavity, said probes having means for connection to a source of steam under pressure whereby steam under pressure may be introduced into said hollow probes and through said perforations into said cavity at spaced locations therein when said probes are disposed in said cavity; and means carried by said probes and engageable with said top wall when said probes are disposed in said cavity for sealing between said top wall and said probes for closing said apertures against flow of fluids from said cavity.

3. An apparatus for fabricating structural modules including: a rectangular mold box providing a cavity having a bottom wall, a pair of side walls disposed on opposite sides of said bottom wall, a pair of end walls disposed on opposite ends of said bottom wall, and a top wall disposed above said side and end walls; means for moving said side walls toward one another and into engagement with outer edges of said bottom and end walls; means for supporting said top wall and for moving said top wall vertically and horizontally between a closed position wherein said top wall is over said end and side walls and closes said cavity and a position remote from and not disposed over said cavity whereby said cavity may be opened for the introduction of an expandable substance thereinto and for the removal of a fabricated module therefrom when said top wall is in said position remote from said cavity, said top wall having a plurality of spaced apertures which open into said cavity when said top wall is disposed in said position over said end and side walls and closing said cavity; a plurality of spaced probes movable into said cavity through said apertures, said probes being hollow and having a plurality of spaced lateral perforations; means for supporting said probes and for moving said probes vertically through said apertures into and out of said cavity, said probes having means for connection to a source of steam under pressure whereby steam under pressure may be introduced into said probes and through said lateral perforations into said cavity at spaced locations therein when said probes are disposed in said cavity.

4. An apparatus for fabricating structural modules including: a rectangular mold box providing a cavity having a bottom wall, a pair of side walls disposed on opposite sides of said bottom wall, a pair of end walls disposed on opposite ends of said bottom wall, and a top wall disposed above said side and end walls; means for moving said side walls toward one another and into engagement with outer edges of said bottom and end walls; means for supporting said top wall and for moving said top wall vertically and horizontally a position wherein said top wall is over said end and side walls and closes said cavity and a position remote from said cavity and not disposed thereover whereby said cavity may be opened for introduction of an expandable substance thereinto and for the removal of a fabricated module therefrom when said top wall is in said position remote from said cavity, said top wall having a plurality of spaced apertures which open into said cavity when said top wall is disposed in said position over said end and side walls and closing said cavity; a plurality of spaced probes movable into said cavity through said apertures, said probes being hollow and having a plurality of spaced lateral perforations; means for supporting said probes and for moving said probes vertically through said apertures into and out of said cavity, said probes having means for connection to a source of steam under pressure whereby steam under pressure may be introduced into said probes and through said lateral perforations into said cavity at spaced locations therein when said probes are disposed in said cavity; and means carried by said probes and engageable with said top wall when said probes are disposed in said cavity for closing said apertures against flow of fluids from said cavity.

5. An apparatus for fabricating structural modules including: a rectangular mold box providing a cavity having a bottom wall, a pair of side walls disposed on opposite sides of said bottom wall, a pair of end walls disposed on opposite ends of said bottom wall, and a top wall disposed above said side and end walls; means for moving said bottom wall between a first position wherein it is disposed between said side walls and a position wherein said bottom wall is disposed outwardly of said side walls and said top wall; means for moving said side walls toward one another and into engagement with outer edges of said bottom and end walls; means for supporting said top wall and for moving said top wall vertically and horizontally between a position over said end and side walls and closing said cavity and a position remote from said cavity and not disposed thereover whereby said cavity may be opened for introduction of an expandable substance thereinto and for the removal of a fabricated module therefrom when said top wall is in said position remote from said cavity, said top wall having a plurality of spaced apertures which open into said cavity when said top wall is in said position over said end and side walls and closing said cavity; a plurality of spaced probes movable into said cavity through said apertures, said probes being hollow and having a plurality of spaced lateral perforations; means for supporting said probes and for moving said probes vertically through said apertures into and out of said cavity, said probes having means for connection to a source of steam under pressure whereby steam under pressure may be introduced into said probes and through said perforations into said cavity at spaced locations therein when said probes are disposed in said cavity.

6. An apparatus for fabricating structural modules including: a rectangular mold box providing a cavity having a bottom wall, a pair of side walls disposed on opposite sides of said bottom wall, a pair of end walls disposed on opposite ends of said bottom wall; a top wall disposed above said side and end walls; means for supporting said top wall and for moving said top wall vertically and horizontally between a position over said end and side walls and closing said cavity and a position remote from and not disposed over said cavity whereby said cavity may be opened for introduction of an expandable substance thereinto and for the removal of a fabricated module therefrom when said top wall is in said position remote from said cavity, said top wall having a plurality of spaced apertures which open into said cavity when said top wall is disposed in said position over said end and side walls and closing said cavity; a plurality of spaced probes movable into said cavity through said apertures, said probes being hollow and having a plurality of spaced lateral apertures; means for supporting said probes and for moving said probes vertically through said apertures into and out of said cavity, said probes having means for connection to a source of steam under pressure whereby steam under pressure may be introduced into said probes and through said lateral perforations into said cavity at spaced locations therein when said probes are disposed in said cavity; and filler means connected to and movable with said top wall and disposed over said cavity when said top wall is in said position remote from said cavity for filling said cavity with a granular substance.

7. The apparatus of claim 6 and a closure plate mounted adjacent said mold box for closing said filler means when said filler means move away from said cavity when said top wall moves from said position remote from said cavity toward said position over said end and side walls and closing said cavity.

8. The device of claim 7, wherein said closure plate is mounted for limited movement toward and away from said mold box between a first position wherein said closure plate extends over a side wall to the cavity and a second position wherein said closure plate is spaced from said cavity; means biasing said closure plate toward said first position; and co-engageable means on said filler means and said closure plate for moving said closure plate to its second position as said top wall completes movement from said position remote from said cavity toward its said position over said end and side walls and enclosing said cavity.

9. An apparatus for fabricating structural modules including: a pair of mold boxes, each of said mold boxes having a cavity and each having at least one portion movable to open said cavity to permit the introduction of substances into the cavity and the removal of the fabricated module therefrom, each of said mold boxes having a plurality of spaced apertures opening into said cavity; a plurality of elongate spaced probes movable into the cavity of each of said mold boxes through said apertures, said probes being hollow and having a plurality of spaced lateral perforations, said probes having means for connection to a source of steam under pressure; a source of steam under pressure and means for selectively admitting steam under pressure from said source of steam under pressure to the probes of each of said mold boxes whereby steam from the probes may flow through said lateral perforations into said cavities when said probes are disposed in said cavities.

10. An apparatus for fabricating structural modules including: a pair of mold boxes, each of said mold boxes having a cavity and each having at least one wall movable to open said cavity to permit introduction of substances into the cavity and removal of the fabricated module therefrom, each of said mold boxes having chambers through which heating and cooling fluids may be circulated for heating and cooling the surfaces of said mold boxes defining said cavities, each of said mold boxes having a plurality of spaced apertures opening into said cavity; a plurality of elongate spaced probes movable into said cavities through said apertures, said probes being hollow and having a plurality of spaced lateral perforations whereby steam under pressure may be introduced into said probes and through said lateral perforations of said probes into said cavities when said probes are disposed in said cavities; means for selectively circulating heating fluid from a single source through said chambers of each of said mold boxes from a common source of heating fluid and for selectively circulating cooling fluid from a single source through the chambers of each of said mold boxes; and means for selectively connecting the probes of each of said mold boxes to a common source of steam under pressure.

11. An apparatus for fabricating structural modules including: a mold box having a semi-cylindrical elongate bottom section and a semi-cylindrical top section, said top section being movable to a position overlying and engaging said top section to form a cavity therewith; means for securing said top section in position overlying said lower section, one of said sections having a plurality of spaced passages communicating with said cavity when said top section is in said position overlying said bottom section, said probes being hollow and having a plurality of spaced lateral apertures, said probes being a plurality of spaced probes movable through said passages into said cavity and connectable to a source of steam under pressure whereby steam under pressure is introducible into said probes and from said probes through said lateral perforations into said cavity when said probes are disposed in said cavity, and closure means carried by said probes and engageable with said top section when said probes are disposed in said cavity to close said passages to prevent flow of fluid from said cavity through said passages.

12. An apparatus for fabricating modules including: a supporting frame having a base section and a top section; a mold box including a bottom wall, a pair of end walls movably secured to said bottom wall for movement toward and away from each other, a pair of side walls secured to said base section, and a top wall, said base section having rail means, said bottom wall being mounted for movement on said rail means between an inner position between said base and top sections of said supporting frame and between said side walls and an outer position wherein said bottom wall is disposed outwardly of said supporting frame and of said side walls; carriage means movably mounted on said top section and connected to said top wall for supporting said top wall; means for moving said carriage whereby said top wall may be moved laterally between a first position overlying said rear and front end walls and said side walls and a second position remote from said side and end walls; means carried by said carriage for moving said top wall vertically whereby said top wall may be moved when in said first position into engagement with said rear and end walls when said bottom wall is in said inner position whereby said walls may define a cavity, said top wall having a plurality of spaced apertures opening into said cavity when said top wall is in its first position; a plurality of spaced probes carried by said carriage and movable downwardly through said apertures into said cavity, said probes being hollow and having spaced lateral apertures; means carried by said carriage for moving said probes vertically; and means for connecting said probes to a source of steam under pressure whereby steam may be admitted into said probes and through said lateral apertures into said cavity at a plurality of spaced points throughout said cavity when said probes are disposed within said cavity.

13. The apparatus of claim 12 and filler means connected to said carriage and movable therewith, said filler means being positionable over said cavity when said top wall is in said second position whereby granular means may be introduced into said cavity when said top wall is in said second position.

14. The apparatus of claim 13; and closure means carried by said supporting frame for closing said filler means as said top wall moves from said second position toward said first position.

15. The apparatus of claim 12, wherein said side walls are pivotally secured to said base section for pivotal movement about parallel horizontal axes toward and away from each other and said bottom wall; and means for moving said side walls toward and away from each other.

16. The apparatus of claim 15, wherein said side walls and said end walls have co-engageable means for preventing outward movement of said end walls away from each other when said side walls are pivoted toward one another.

17. The apparatus of claim 12, wherein said bottom wall is provided with a plurality of wheels engageable with said rails; and co-engageable means on said bottom wall and said base section for disengaging said wheels from said rail and for supporting said bottom wall on said base section when said bottom wall moves to said inner position.

References Cited by the Examiner
UNITED STATES PATENTS

| | | | |
|---|---|---|---|
| 656,192 | 8/00 | Howard | 25—127 |
| 2,361,933 | 11/44 | Ferla | 25—30 |
| 2,781,570 | 2/57 | Seymour | 25—121 XR |
| 2,951,260 | 9/60 | Harrison et al. | 18—5 |
| 3,042,967 | 7/62 | Edberg | 18—5 |
| 3,042,973 | 7/62 | Brockhues et al. | 18—48 |
| 3,057,007 | 10/62 | Vanden Berg | 18—5 |
| 3,058,162 | 10/62 | Grabowski | 18—48 |
| 3,075,240 | 1/63 | Casavina et al. | 18—5 |

WILLIAM J. STEPHENSON, *Primary Examiner.*
MORRIS LIEBMAN, MICHAEL V. BRINDISI,
*Examiners.*